United States Patent
Rooney et al.

(10) Patent No.: US 6,598,069 B1
(45) Date of Patent: Jul. 22, 2003

(54) METHOD AND APPARATUS FOR ASSIGNING RESOURCES TO LOGICAL PARTITION CLUSTERS

(75) Inventors: William J. Rooney, Hopewell Junction, NY (US); Harry M. Yudenfriend, Poughkeepsie, NY (US); Jeffrey P. Kubala, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/407,810

(22) Filed: Sep. 28, 1999

(51) Int. Cl.$^7$ .................................................. G06F 9/00
(52) U.S. Cl. ...................................................... 709/104
(58) Field of Search ................................ 709/100, 102, 709/104; 712/13, 30, 227

(56) References Cited

U.S. PATENT DOCUMENTS

| | | | |
|---|---|---|---|
| 5,257,379 A | * 10/1993 | Cwiakala et al. | ............... 713/1 |
| 5,301,323 A | 4/1994 | Maeurer et al. | |
| 5,420,988 A | 5/1995 | Elliott | |
| 5,423,026 A | 6/1995 | Cook et al. | |
| 5,471,609 A | * 11/1995 | Yudenfriend et al. | ........... 714/4 |
| 5,548,791 A | 8/1996 | Casper et al. | |
| 5,568,648 A | 10/1996 | Coscarella et al. | |
| 5,644,712 A | 7/1997 | Coscarella et al. | |
| 5,659,756 A | * 8/1997 | Hefferon et al. | ............. 710/200 |
| 5,712,974 A | 1/1998 | Gainey et al. | |
| 6,047,332 A | * 4/2000 | Viswanathan et al. | ....... 709/245 |

* cited by examiner

Primary Examiner—St. John Courtenay, III
Assistant Examiner—George L. Opie
(74) Attorney, Agent, or Firm—William A. Kinnaman, Jr.; Cantor Colburn LLP (57) ABSTRACT

An exemplary embodiment of the invention is a method for assigning resources in a system configurable into logical partition clusters. The method includes defining at least one logical partition cluster. A LPC name index record storing a LPC name index for each of a plurality of resources is provided. The LPC name index record is indexed by a resource identifier. A LPC name record storing at least one LPC name is also provided. At least one LPC name index points to a LPC name in the LPC name record and each LPC name identifies an LPC. A resource is assigned to a group in response to the LPC name index record and the LPC name record.

18 Claims, 12 Drawing Sheets

FIG. 1a
DIAGNOSE 300

FIG. 1b

```
   · Goto  Filter  Backup  Query  Help
C ┌──────────────────── Add Channel Path ────────────────────┐
  │ Specify or revise the following values.                  │
S │                                                          │
P │ Processor ID . . . : SYS1      Dynamic CHPID Management (LPAR Mode)
C │ Configuration mode : LPAR                                │
  │                                                          │
  │ Channel path ID  . . . . . . .  20 +                     │
  │ Number of CHPIDs  . . . . .  1                           │
  │ Channel path type  . . . . . . CNC  +                    │
/ │ Operation mode  . . . . . . .  SHR  +                    │
  │                                                          │
─ │ LPC Name : PLEX1                                         │
─ │ Description : . . . . . . . . . . . ________             │
─ │                                                          │
─ │ Specify the following values only if connected to a switch : │
/ │                                                          │
  │ Dynamic switch ID  . . . . . . . . . 02 + (00 - FF)      │
─ │ Entry switch ID  . . . . . . . . . .  _ +                │
─ │ Entry port  . . . . . . . . . . . .   _ +                │
  │                                                          │
─ │ F1 = Help   F2 = Split   F3 = Exit   F4 = Prompt   F5 = Reset   F9 = Swap │
─ │ F12 = Cancel                                             │
  └──────────────────────────────────────────────────────────┘
─  DA   CNC   DED   __  __  __        S40 : UNUSED
─  DB   CNC   DED   __  __  __        S40 : UNUSED
─  DC   CFS   DED   __  __  __   N    S40 : CF2SM CHP 10
─  DD   CFS   DED   __  __  __   N    S40 : UNUSED ─  F1 = Help      F2 = Split    F3 = Exit     F4 = Prompt   F5 = Reset   F7 = Backward
─  F8 = Forward   F9 = Swap     F10 = Actions F11 = Add     F12 = Cancel F13 = Instruct
─  F20 = Right    F2 = Command
```

FIG. 4b
Store-Configuration-
Component CHSC

METHOD AND APPARATUS FOR ASSIGNING RESOURCES TO LOGICAL PARTITION CLUSTERS

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Processing Channel Subsystem Pending I/O Work Queues Based on Priorities," Maergner et al., Ser. No. 09/407,459, filed herewith;

"Method, System And Program Products For Managing Groups Of Partitions Of A Computing Environment," Kubala et al., Ser. No. 09/407,391, filed herewith;

"Method, System And Program Products For Managing Logical Processors Of A Computing Environment," King et al., Ser. No. 09/407,594, filed herewith;

"Method, System And Program Products For Managing Central Processing Unit Resources Of A Computing Environment," Eilert et al., Ser. No. 09/407,212, filed herewith;

"Dynamically Redistributing Shareable Resources Of A Computing Environment To Manage The Workload Of That Environment," Kubala et al., Ser. No. 09/408,470, filed herewith;

"Method, System And Program Products For Managing I/O Configurations Of A Computing Environment," Cwiakala et al., Ser. No. 09/407,544, filed herewith;

"Method, System And Program Products For Determining I/0 Configuration Entropy," William J. Rooney, Ser. No. 09/407,453, filed herewith; and "Method And Apparatus For Creating And Identifying Logical Partition Clusters," Rooney et al., Ser. No. 09/407,514, filed herewith.

BACKGROUND OF THE INVENTION

Central processing complexes made up of a plurality of processors and associated hardware may be configured through logical partitioning into one or more groups of cooperating system images. Cooperating system images across multiple logical partitions within a single central processor complex (CPC) or across multiple CPCs can be grouped together for a common general purpose into an entity called a sysplex. The system images within a sysplex may share common physical resources. As time passes, it is becoming necessary to group together cooperating system images within a single CPC for different specific purposes as opposed to the general sharing of resources that occurs in a sysplex. Hence, a mechanism is needed to create and identify different types of collections of cooperating system images.

A group of system images, or sysplex, communicates with external devices over one or more channels to a control unit which is connected to the external device. There exists a method of assigning channels to a group of logical partitions. The user can set an existing PARTITION keyword in the input/output configuration program (IOCP) or implement a similar function in the hardware configuration definition (HCD) program. By doing this, the user can explicitly specify which logical partitions may access a specific channel.

One problem with this approach is that it requires the user to associate the channel with a specific set of partitions and if the partition is later assigned to another group, the user is responsible for changing the PARTITION keyword to change the resource to partition associations. If the user does not do this, then there is risk that a partition could lose its last channel to a control unit. In addition, the user could assign non-cooperating groups to the same channel path, exposing the system to errors, data corruption and loss of availability.

SUMMARY OF THE INVENTION

An exemplary embodiment of the invention is a mechanism for creating and identifying different kinds of groups of cooperating system images within a single machine, a single central processor complex (CPC) where each kind of group has a different functional purpose. Such a collection of cooperating system images is referred to as a logical partition cluster (LPC). An LPC is created or identified using a diagnose instruction. The diagnose instruction includes a subcode field designating a function to be performed and a logical partition cluster type field indicating the type of logical partition cluster said function is to be performed on.

Another exemplary embodiment of the invention is a method for assigning resources in a system configurable into logical partition clusters. The method includes defining at least one logical partition cluster having at least one system image. An LPC name index record storing an LPC name index for each of a plurality of resources is provided. The LPC name index record is indexed by a resource identifier. An LPC name record storing at least one LPC name is also provided. At least one LPC name index points to an LPC name in the LPC name record and each LPC name identifies a logical partition cluster. A resource is assigned to a logical partition cluster in response to the LPC name index record and the LPC name record.

BRIEF DESCRIPTION OF THE DRAWINGS

FIG. 3b is a flowchart of the logical partition processing for the individual channel path identifiers (CHPIDs) shown in FIG. 3a;

DETAILED DESCRIPTION

An exemplary embodiment of the invention is a mechanism for creating a number of different types of logical partition clusters and associating logical partitions with those clusters. The mechanism is an instruction, referred to by the inventors as Diagnose 300, depicted in FIG. 1a. The diagnose instruction may be used to register a particular logical partition as a member of a logical partition cluster of the specified name and type. There is no requirement for a one to one correspondence between logical partitions and logical partition clusters. A logical partition may belong to multiple logical partition clusters. The logical partition manager (PR/SM) keeps track of the name and type of the different clusters created and all the logical partitions contained in each logical partition cluster. In addition to forming logical partition clusters, there are also functions that operate on logical partition clusters. An obtain name function may be used to determine if the issuing logical partition belongs to a logical partition cluster of the specified type and if so, get the name of that logical partition cluster.

Figure 1A:
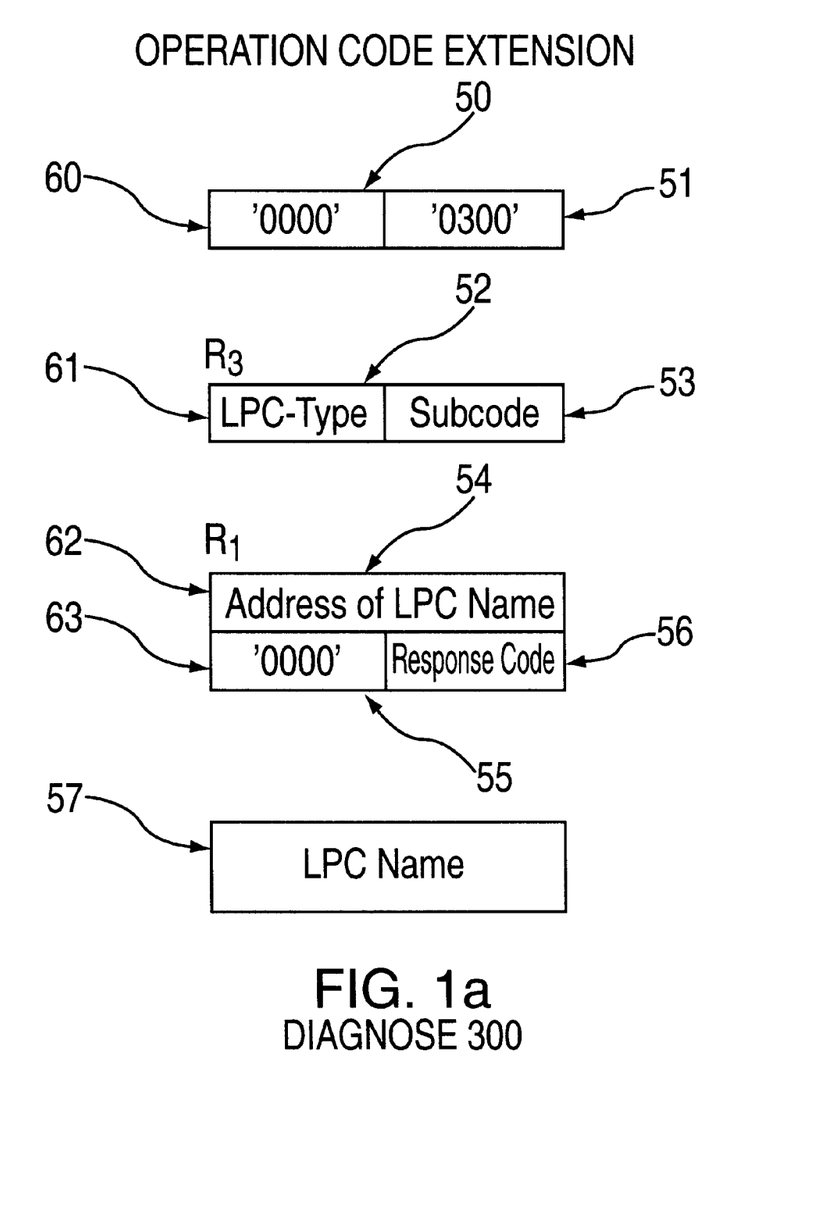
FIG. 1a depicts a Diagnose 300 Declare Name instruction.

FIG. 1a shows the details of a diagnose instruction in an exemplary embodiment of the invention. The general form of the diagnose instruction is documented in "Enterprise Systems Architecture/390 Principles of Operation" (IBM Publication: SA22-7201-05) the contents of which are incorporated herein by reference. FIG. 1a depicts the operation code extension 60, a general register $R_3$ shown at 61, even-odd register pair $R_1$ shown at 62 and 63 and a double word shown at 57 containing the LPC name. Bit positions 16–31 (shown at 51) of the operation code extension 60 contain the actual operation code extension. Bit positions 0–15 (shown at 50) of the operation code extension 60 are ignored.

When the bits 16–31 of the operation code extension 60 is 0300 hex, general register $R_3$ shown at 61 contains a subcode field 53 and an LPC type field 52. The subcode field 53 is located in bits 16–31 of general register $R_3$ shown at 61 and specifies the function to be performed by the diagnose instruction. The LPC type field 52 is in bits 0–15 of general register $R_3$ shown at 61 and specifies the logical partition cluster type that will be processed by the function designated by subcode field 53.

General register $R_1$ shown at 62 is the even register of an even-odd pair of registers. General register $R_1$ contains the address 54 of a double word 57 containing the LPC name. The odd general register of the pair, $R_1$+1 shown at 63, contains a response code 56 returned by the diagnose instruction, indicating the success or reason for failure of the command. Bits 0–15 shown at 55 of the odd general register 63 are ignored.

The subcode field in general register $R_3$ shown at 61 can designate the following functions:

0: Declare Name
1: Obtain Name

The LPC type field in general register $R_3$ shown at 61 can designate the following LPC types:

0: System Name
1: LPC for Channel Path Management
2: LPC for CPU Management

The diagnose instruction can be used to perform different operations on different types of LPC's by controlling the values of the subcode field 53 and the type field 52. When the declare name function is specified for a type-0 LPC, the program declares the name of the operating system executing in the issuing logical partition. When the declare name function is specified for a type-1 LPC or above, the program declares the name of the logical partition cluster of the specified LPC type, of which the issuing logical partition is a member. The declare name function is also referred to herein as creating a logical partition cluster. General register $R_1$ shown at 62 contains the address of a double word 57 containing the system name or the LPC name of the specified LPC type, to be declared.

When the obtain name function is specified for a type-0 LPC, the logical partition manager provides the name of the operating system, if any, previously declared by a program executing in the issuing logical partition. When the obtain-name function is specified for a type-1 LPC or above, the logical partition manager (PR/SM) provides the name of the logical-partition cluster of the specified LPC type, if any, previously declared by a program executing in the issuing logical partition. The obtain name function is also referred to herein as identifying a logical partition cluster. This is the name of the logical partition cluster of the specified LPC type, of which the issuing logical partition is a member. The declared system name or declared LPC name of the specified LPC type is stored at the double word 57 designated by the address contained in general register $R_1$ shown at 62.

Figure 1B:
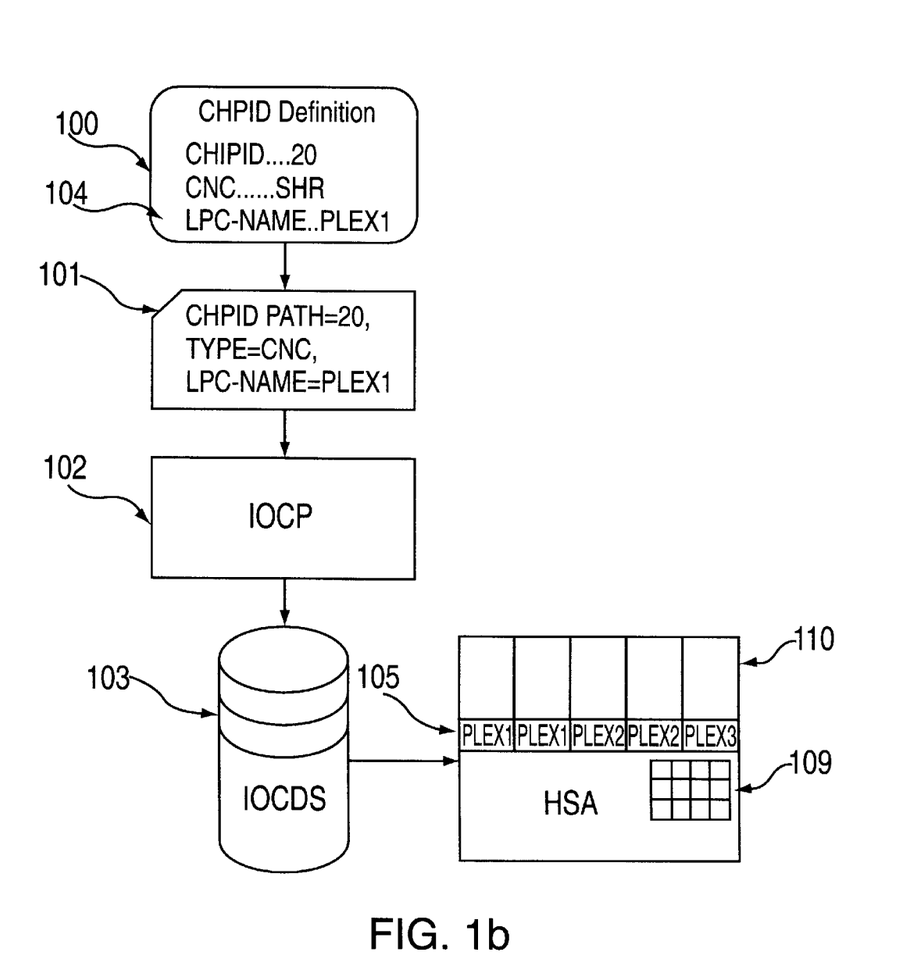
FIG. 1b depicts an I/O customization process.
Figure 1C:
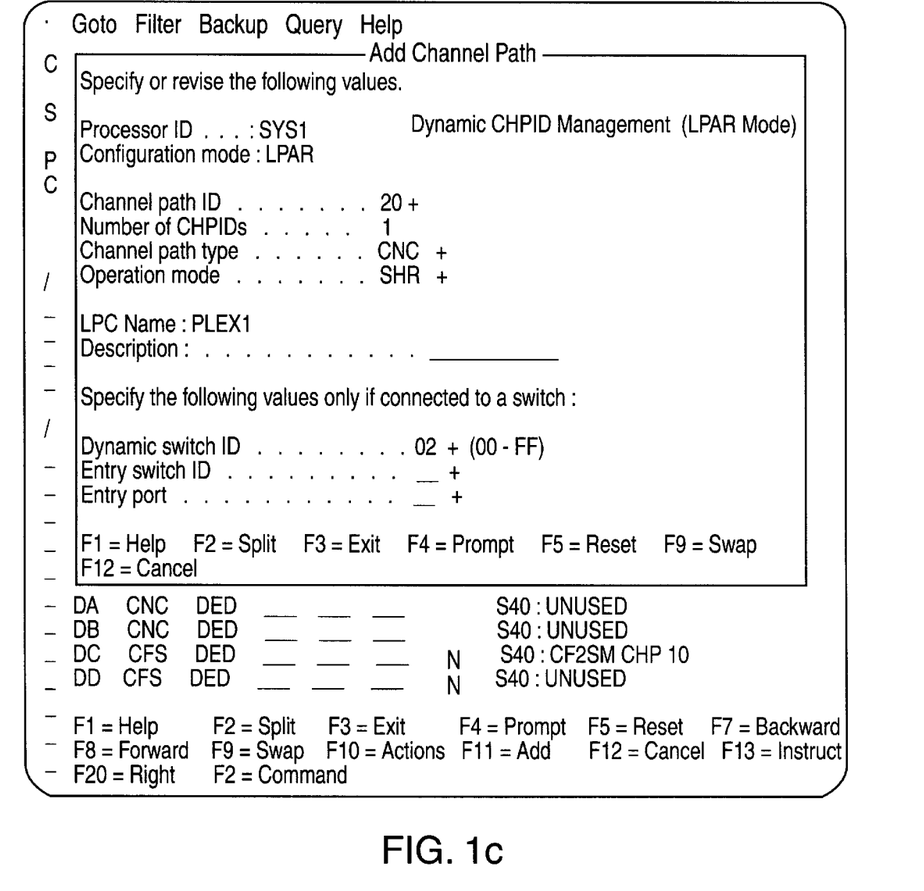
FIG. 1c depicts addition of a channel path.

Another exemplary embodiment of the invention is a method of assigning CHPIDs to different groups of system images that are members of a logical partition cluster for channel path management. The method may be used in connection with a variety of systems including the IBM Parallel Sysplex® multi-processor system. FIG. 1b depicts an operating system I/O configuration customization process. At 100, a user interface (FIG. 1c) allows each channel path to be defined with an LPC name. The LPC name 104 specifies up to an 8 byte name used to identify the set of partitions that are part of the same logical cluster of cooperating processors. At 101, the operating system configuration process then creates the interface to the machine IOCP to customize the machine definition. This interface to the IOCP program takes the form of text records. These text records are then processed by the IOCP program at 102 to create an I/O Configuration Dataset (IOCDS) as shown at 103. The IOCDS is used as input to the machine power-on-reset process (POR) to initialize the machine for processing. The IOCDS contains two new records based on the LPC names. These two records are the CHPID LPC name index record 200 (shown in FIG. 2) and the LPC name record 202 (shown in FIG. 2). During POR, these two records are used to create tables 109 in the hardware system area (HSA) 110. The HSA 110 also includes the LPC names as shown at 105. FIG. 1b shows an example of the CHPID definition options. As shown in FIG. 1b, a channel path having an ID 20 is defined as SHARED among the partitions on the central processor complex. The LPC name, PLEX1, identifies the group of system images that has exclusive use of the channel path.

Figure 2:
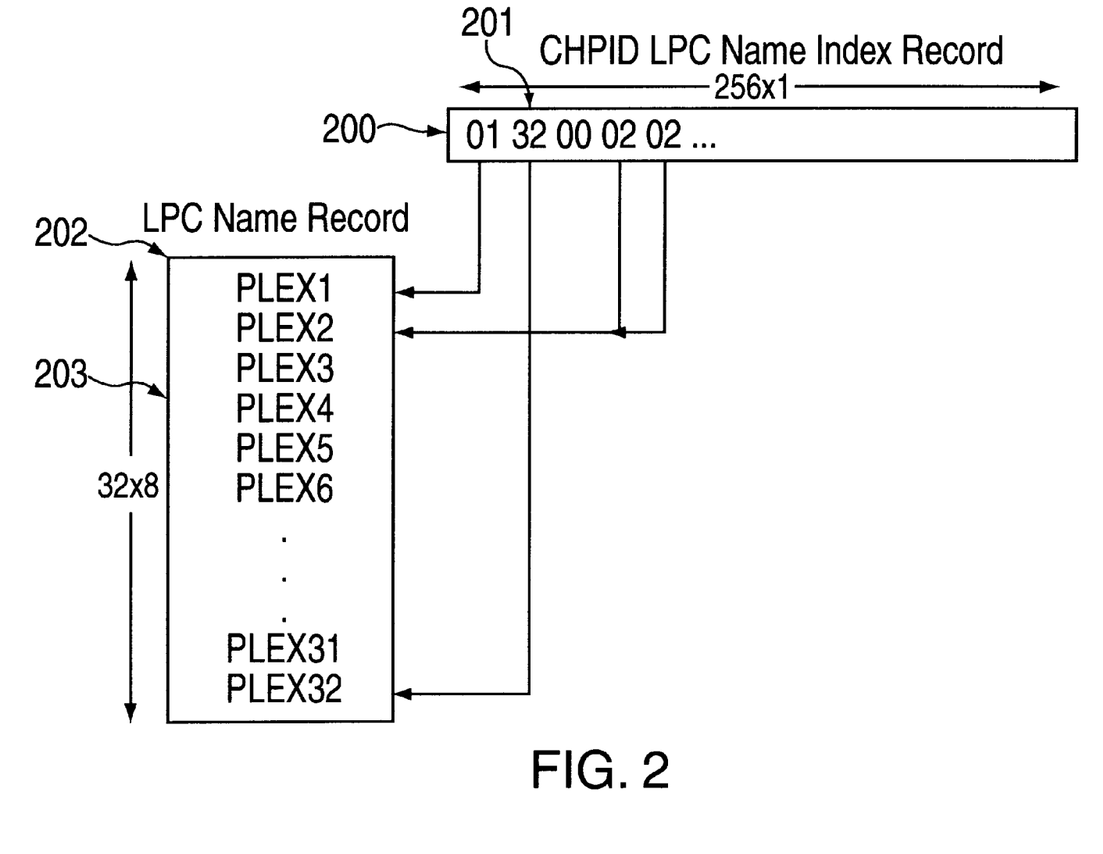
FIG. 2 shows the internal tables created by the IOCP program in an input output configuration dataset (IOCDS)

FIG. 2 depicts the CHPID LPC name index record 200 and the LPC name record 202 contained in the IOCDS 103. The CHPID LPC name index record 200 contains 256 one byte entries. This corresponds to one entry for every possible CHPID on the machine. The CHPID LPC name index 201 is used to index into the LPC name record 202 in order to obtain the LPC name 203. Thus, the CHPID LPC name index record 200 is used to identify the LPC name record position that contains the LPC name 203 identifying the group of one or more system images that is to access the CHPID. A value of zero in the CHPID LPC name index record 200 denotes that the LPC name was not used in the definition of the CHPID. If a zero is stored for a particular CHPID in the CHPID LPC name index record 200, use of the channel path is not restricted to any group of system images based on the LPC name.

The LPC name record 202 contains an array of up to 32 eight byte LPC names 203. This array is indexed by the values 1 to 32 in the CHPID LPC name index record 200. Both the LPC name index record 200 and the LPC name record 202 are used to create tables in the HSA 109.

Figure 3A:
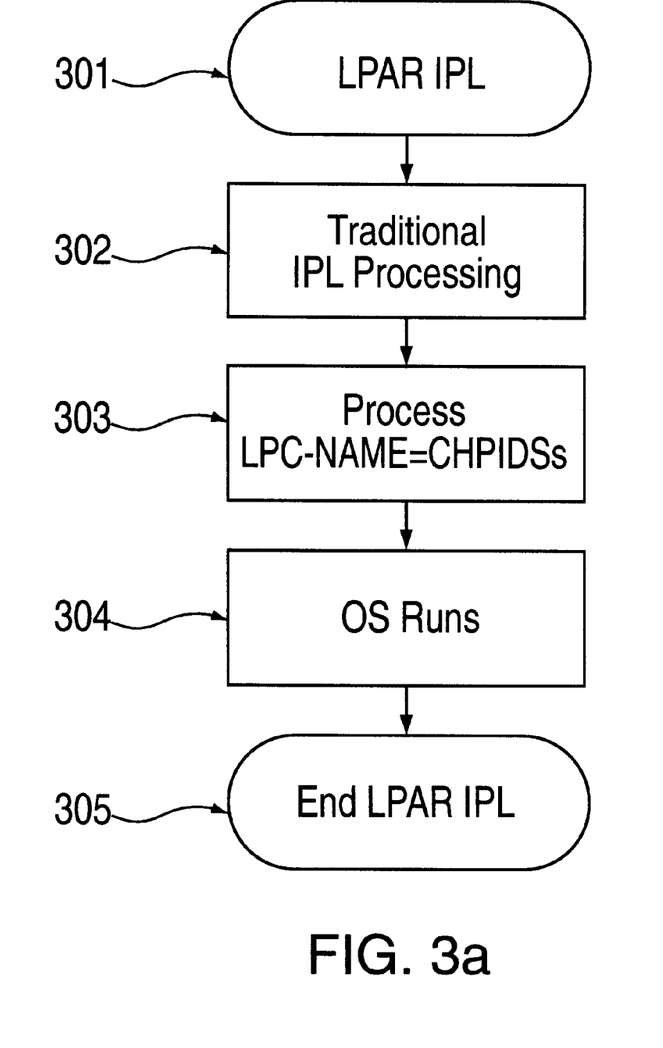
FIG. 3a is a flowchart of processor resource/systems manager (PR/SM) hypervisor code processing when activating a partition.
Figure 3B:
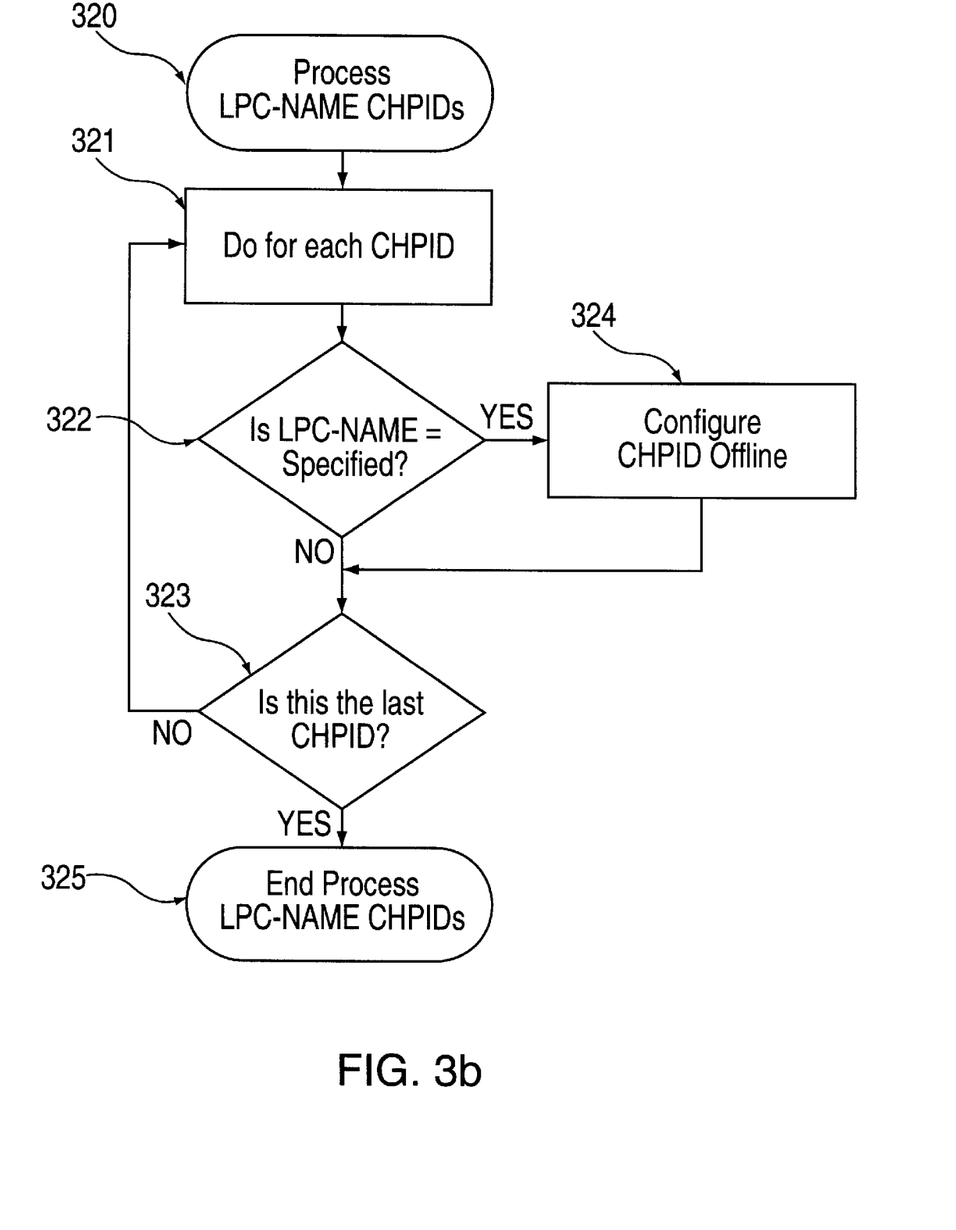

FIG. 3a shows a logical partition management initialization function. When the installation chooses to activate a logical partition on a CEC as shown at 301, the logical partition manager gets control to perform some traditional initialization functions 302. These traditional initialization functions include issuing an I/O interface system reset to all the channel paths accessible by the partition, initializing internal state information, etc. After the traditional initialization is complete, the hypervisor determines which channel paths were defined with a LPC name at 303. The details of step 303 are shown in FIG. 3b and described below. After all the CHPIDs defined with a LPC name have been processed, control is given to the operating system in order for it to initialize and begin processing the customers intended workload as shown at 304. The initialization processing then completes as shown at 305.

FIG. 3b shows the detailed processing for step 303 of FIG. 3a. For each channel path defined in the configuration, the logical partition manager first checks to see if the LPC name was specified for the channel path 322. This is done by locating the CHPID entry in CHPID LPC name index record 200. The CHPID) LPC name index record 200 is indexed into by the CHPID number to locate a one byte LPC name index 201. If the LPC name index 201 is zero, then the LPC name was not specified for the subject CHPID and processing continues to step 323. If the CHPID LPC name index 201 is not zero, then the LPC name was specified for the CHPID and the CHPID is then configured offline at step 324. If a CHPID remains to be processed at step 323, flow proceeds to 321 where the next CHPID is processed. Processing continues until every CHPID defined in the configuration has been processed. After all the CHPIDs channel paths have been processed, flow proceeds to step 325 and the initialization continues with step 304 of FIG. 3a.

Figure 3C:
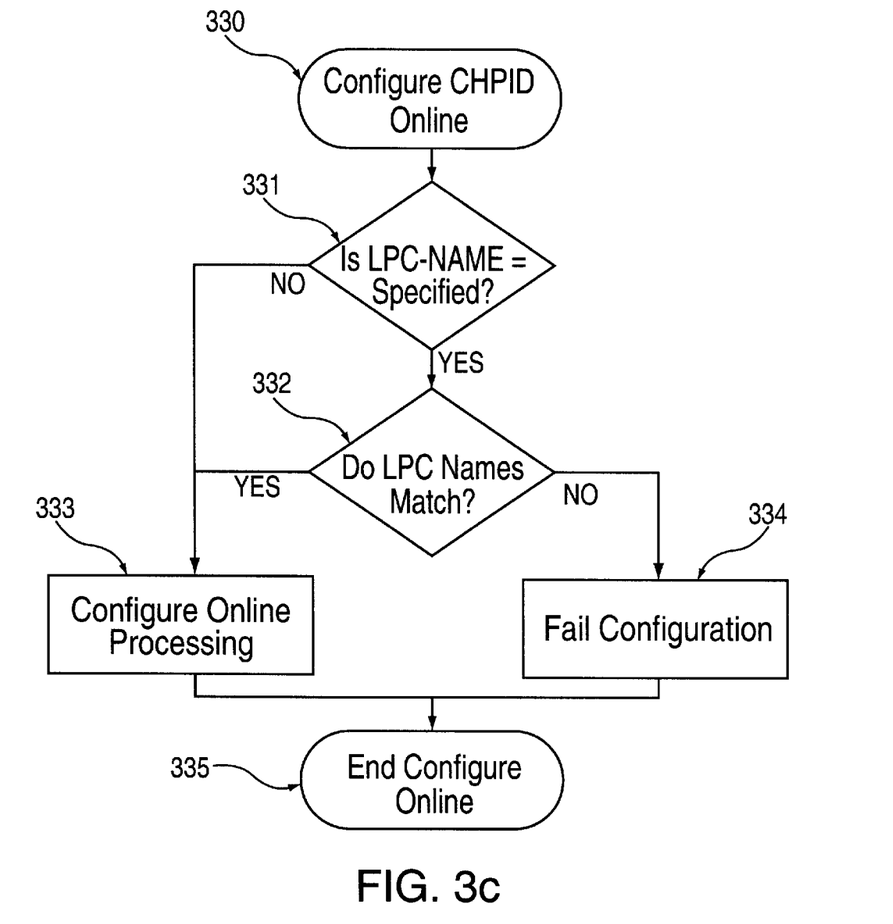
FIG. 3c is a flowchart of a configure CHPID online process.

FIG. 3c shows the processing when the logical partition manager is given control to configure a channel path online. The processing in FIG. 3c occurs when control is passed to the logical partition manager from the operating system (shown at step 406 in FIG. 4a) or as a result of an operator command to configure CHPIDs that are offline to the online state to make them available for use. At 331, the logical partition manager determines whether or not the LPC name has been specified by accessing the CHPID LPC name index record 200 using the CHPID number for the channel path being configured. If the LPC name index 201 is zero, then the CHPID is allowed to come online at 333. If the LPC name index 201 is not zero, then the LPC name index 201 is used to retrieve the LPC name 203 for the CHPID from the LPC name record 202. At 332, the LPC name 203 from the LPC name record 202 is compared to the current LPC name stored in the HSA 110, in step 402. If the names match then the CHPID is allowed to come online as shown at 333. If the names do not match then the process fails at step 334 and the issuer is notified. The configure CHPID process ends at step 335.

Figure 4A:
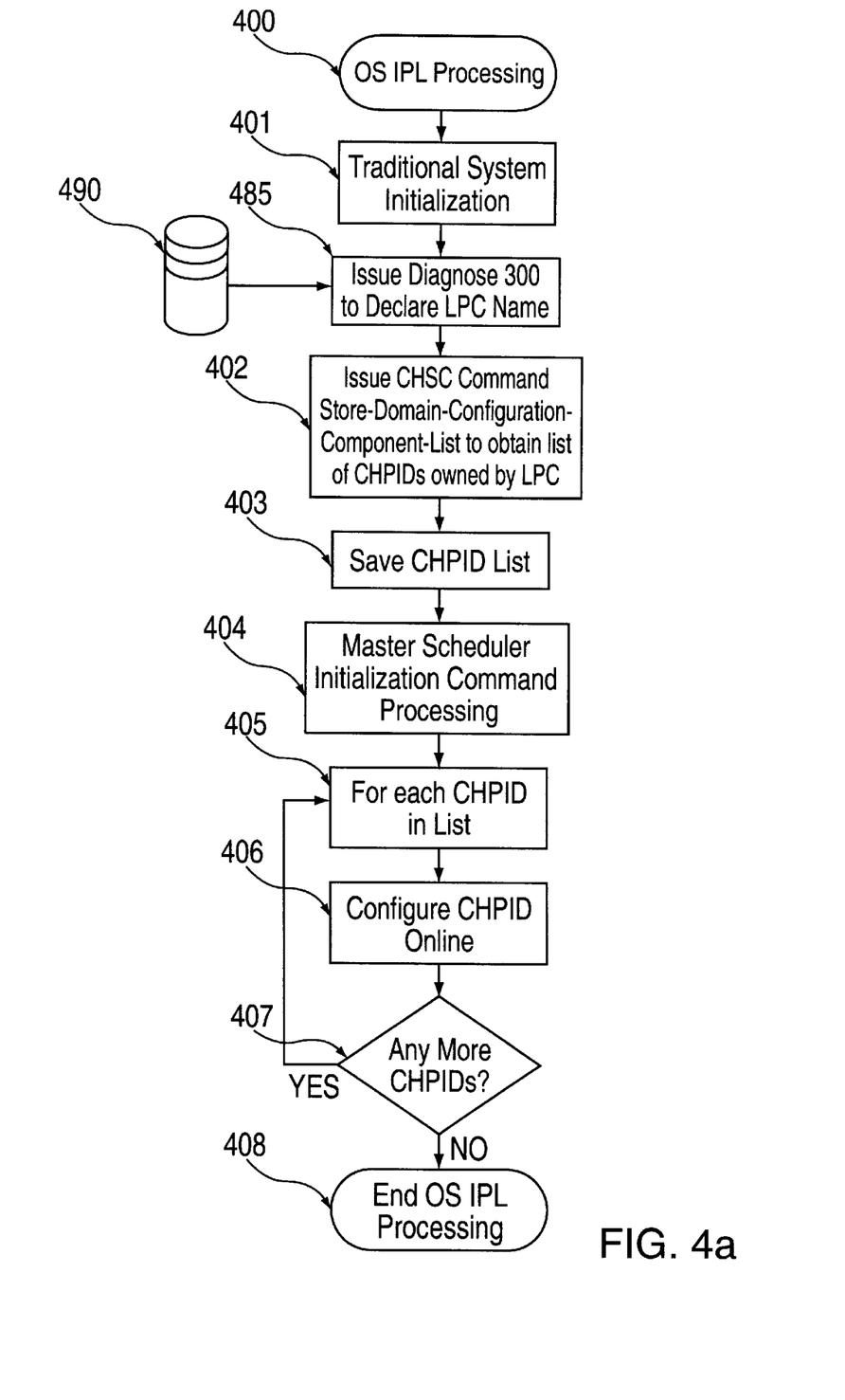
FIG. 4a is a flowchart of an operating system initialization process used to register a logical partition as a member of a logical-partition cluster (LPC) for channel-path management by declaring a LPC name.

FIG. 4a is a flowchart of an operating system initialization process. The operating system is given control to begin processing at step 400 from the logical partition manager in step 304 in FIG. 3a. At 401, traditional operating system initialization occurs which includes loading the system code from the IPL device, initializing storage, initializing tables and state information for the operating system, identifying the hardware resources available for use, processing customization information supplied by the installation, etc. One of the customization parameters shown at 490 is the name of the LPC that the operating system is to join. This LPC name is used to construct input parameters of the diagnose instruction. The diagnose instruction is issued at 485 to inform the system (logical partition manager and channel subsystem) of the identity of the operating system in order to establish ownership of the hardware resources to be used (e.g. CHPIDs). Next, in step 402 the operating system issues the Store-Configuration-Component-List Channel Subsystem Call Instruction (CHSC) in order to retrieve the list of configuration components useable by the operating system identified (485). These configuration components returned are the CHPIDs that are to be dynamically managed, but not necessarily limited to CHPIDs in this invention. The CHSC processing is described below with reference to FIG. 4c. The operating system saves the list of CHPIDs at step 403. The CHPIDs are initially in the offline state because of steps 320–325 shown in FIG. 3b. Operating system initialization continues until it reaches the point when it is able to issue the commands needed to configure channel paths online at step 404. For each channel path in the list of channel paths with the matching LPC name, the CHPID is configured online through steps 405–407. As described above, step 406 calls steps 330–335 of FIG. 3c. After all the CHPIDs in the list have been processed, the operating system completes its initialization at 408.

The diagnose instruction is used to register a logical partition as a member of a logical-partition cluster (LPC) for channel-path management by declaring a LPC name. When the subcode field 53 of $R_3$ contains a zero and the LPC-type field 52 contains a 1, general register $R_1$ shown at 62 contains the address 54 of a double word 57 containing the LPC name. The odd general register 63, $R_1+1$, contains a response code 56 returned by the diagnose command, indicating the success or reason for failure of the command.

Figure 4B:
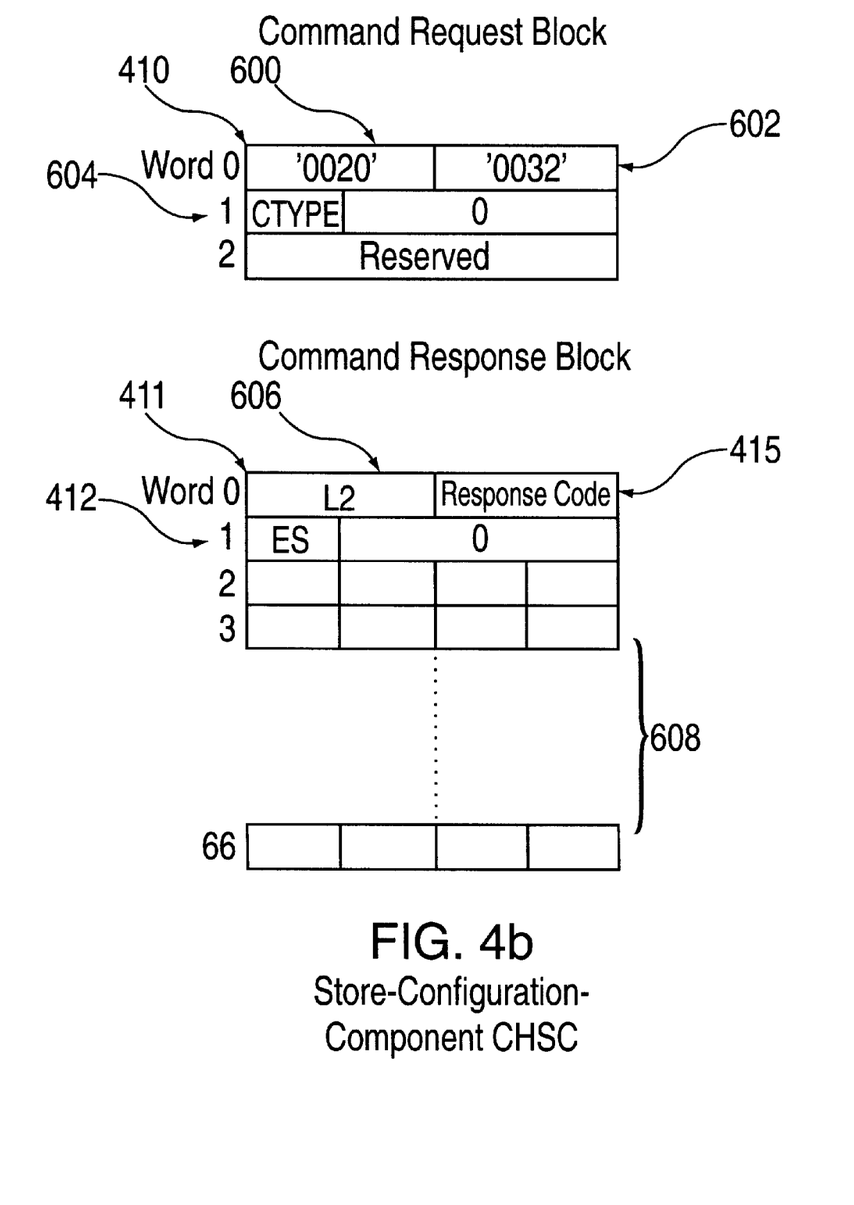
FIG. 4b depicts a Store-Configuration-Component-List Channel Subsystem Call instruction.

FIG. 4b shows the details of the command request block 410 and the command response block 411 for the Store-Configuration-Component-List CHSC command issued at step 402. The command request block 410 includes a length field 600 that contains the value 0020x, a command code 602 that designates the Store-Configuration-Component-List function, 0032x, and a component type code 604 (CTYPE) that identifies the type of hardware component to be queuried by the command.

The command response block 411 includes a length field 606 and list of hardware resources 608 requested by the CTYPE 604. The number of hardware resources in the list is implied by the element size (ES) 412 returned, and the total length of the response block (number of elements=total size 606/element size 412).

Figure 4C:
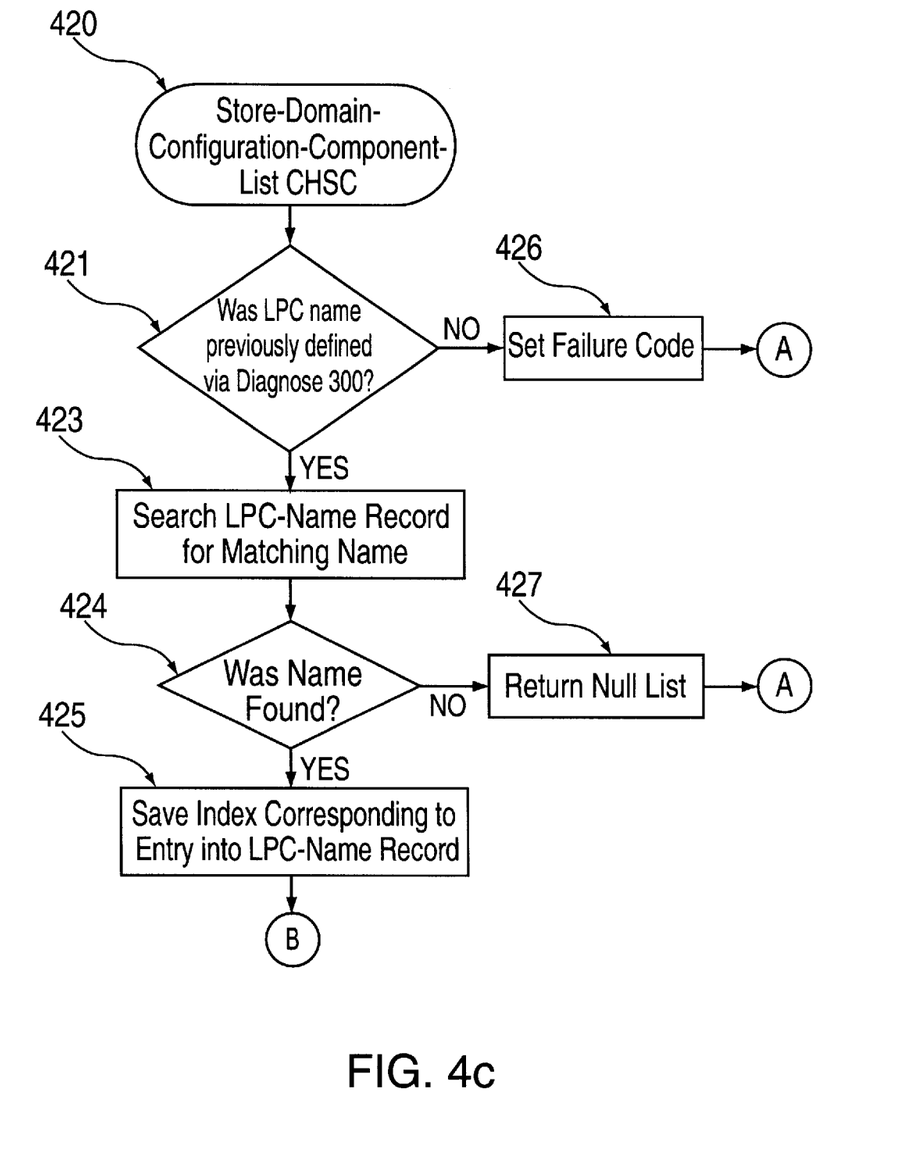
FIGS. 4c–4d are a flowchart of the Store-Configuration-List Instruction.
Figure 4D:
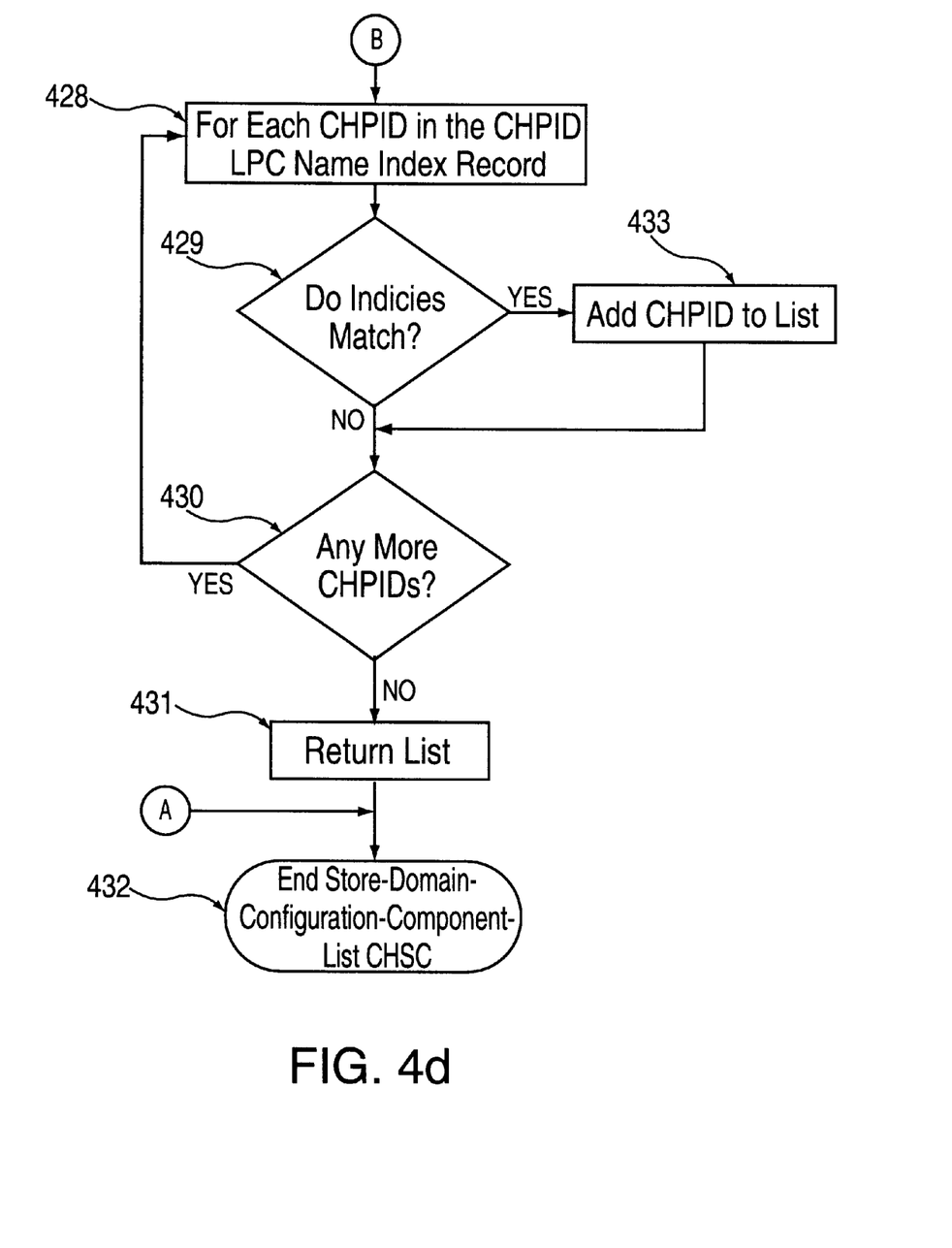

FIG. 4c shows the processing for the Store-Configuration-Component-List CHSC command. This command is issued by the operating system during system initialization at step 402 of FIG. 4a in order to obtain the list of hardware resources (channel paths) that are to be shared among the cooperating members of the LPC. Processing for the Store-Configuration-Component-List CHSC begins at 420. At step 421, it is determined whether the LPC name has previously been defined via diagnose instruction. If the LPC name has not previously been declared, the CHSC fails at 426 with a response code indicating this error and the command terminates at step 432. The LPC name record 202 is then searched at step 423 to see if the name exists for the configuration. At step 424, if the LPC name is contained in the LPC name record 202, the index 201 corresponding to the name 203 is saved at 425 otherwise a null list is returned at 427. For each channel path in the CHPID LPC name index record 200, the index saved at step 425, is compared to the index in the corresponding index 201 in the CHPID LPC name index record 200 at step 429. If the indexes match, at step 433 the corresponding CHPID is added to the list of CHPIDs 608 in the response block 411 and the total size 606 is incremented by the element size 412. This process is repeated for every possible CHPID as shown by steps 430 and 428. Once all the CHPIDs have been processed the response code 415 of 0001x is set. The command response block 411 now defines the total length of the response block (and implicitly the number of CHPIDs), the element size and the identity of the CHPIDs matching the current LPC name 431.

Figure 5:
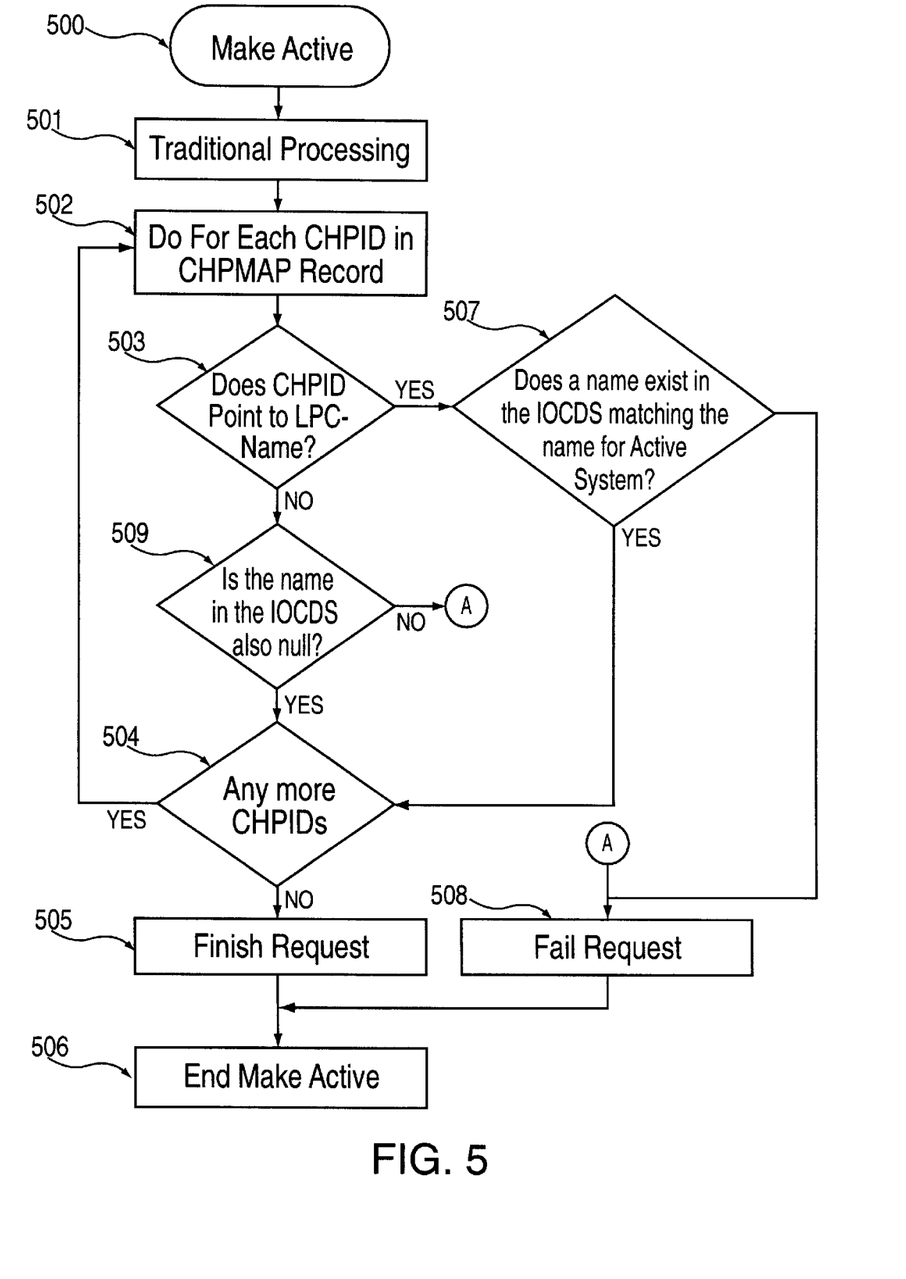
FIG. 5 is a flowchart of a make active IOCDS command.

FIG. 5 details the processing for a make active service call logical processor (SCLP) command. This processing is performed when the system operator chooses to change the default IOCDS for the next POR by issuing a make active command at step 500 such as ACTIVATE SWCHIOCDS=A0. The target IOCDS for the make active command must have a matching I/O configuration token as that contained in the HSA. At step 501, known processing is performed. Validation continues by verifying that all the LPC names contained in the current LPC name record 202 for the active configuration are also contained in the LPC name record of the target IOCDS. At step 503, the CHPID entries in the active configuration's CHPID LPC name index record 200 are examined to find the corresponding LPC name 203 in the active LPC name record 202. If a LPC name exists, this LPC name is compared to the LPC name located in the target IOCDS for the corresponding CHPID at step 507. If the names match, processing continues to the next CHPID as shown by steps 504 and 502. If the names do not match at step 507, then the make active command terminates with an error as shown at 508. If at step 503 the CHPID did not have a corresponding LPC name in HSA, then the CHPID in the target IOCDS must also not have a LPC name associated with it or the make active command will fail as shown at step 509. Once all CHPIDs have been processed without finding any discrepancies between the active system and the target IOCDS, the make active processing completes as shown at 505 and 506.

The above description is related to assigning a channel paths to one or more groups of system images. It is understood, however, that the invention may be used to assign a variety of resources (not just channel paths) to groups of system images. For example, central processors (CPs) may be assigned to groups in a similar fashion. The LPC name index record would be indexed by a central processor identifier. Thus, the invention may be generally described in terms of assigning resources to an LPC based on a resource identifier such as a CHPID.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for assigning resources in a system configurable into logical partition clusters, the method comprising:

defining at least one logical partition cluster (LPC);

providing an LPC name index record storing a LPC name index for each of a plurality of resources, said LPC name index record being indexed by a resource identifier;

providing a LPC name record storing at least one LPC name, at least one LPC name index pointing to a LPC name in said LPC name record, each LPC name identifying an LPC;

assigning a resource to a group in response to the LPC name index record and the LPC name record;

configuring a resource to an offline state if a respective LPC name index points to a LPC name in said LPC name record; and for an LPC identified by a current LPC name, configuring a resource to an online state if said LPC name index points to a LPC name which matches the current LPC name.

2. The method of claim 1 wherein:

said resource is a channel path and said resource identifier is a CHPID.

3. The method of claim 1 wherein:

said LPC name index has a first value if said LPC name index does not point to a LPC name in said LPC name record.

4. The method of claim 3 wherein said first value is zero.

5. The method of claim 1 further comprising:

configuring a resource to an offline state if a respective LPC name index points to a LPC name in said LPC name record.

6. The method of claim 1 further comprising:

for an LPC identified by a current LPC name, configuring a resource to an online state if said LPC name index points to a LPC name which matches the current LPC name.

7. The method of claim 1 further comprising:

storing said LPC name index record and said LPC name record in a current configuration data set;

changing from said current configuration data set to a target configuration data set by comparing current LPC names to corresponding target LPC names; and allowing said changing from said current configuration data set to said target configuration data set in response to said comparing.

8. A system configurable into groups of cooperating system images, each group of system images having access to system resources, the system comprising:

at least one logical partition cluster (LPC);

an LPC name index record storing a LPC name index for each of a plurality of resources, said LPC name index record being indexed by a resource identifier; and a LPC name record storing at least one LPC name, at least one LPC name index pointing to a LPC name in said LPC name record, each LPC name identifying a group;

a resource having an offline state if a respective LPC name index points to a LPC name in said LPC name record; and for an LPC identified by a current LPC name, a resource having an online state if said LPC name index points to a LPC name which matches the current LPC name.

9. The system of claim 8 wherein:

said resource is a channel path and said resource identifier is a CHPID.

10. The system of claim 8 wherein:

said LPC name index has a first value if said LPC name index does not point to a LPC name in said LPC name record.

11. The system of claim 10 wherein said first value is zero.

12. A storage medium encoded with machine-readable program instructions for assigning resources in a system configurable into groups of cooperating system images, the storage medium including instructions for causing a machine to implement a method comprising:

defining at least one logical partition cluster (LPC);

providing a LPC name index record storing a LPC name index for each of a plurality of resources, said LPC name index record being indexed by a resource identifier;

providing a LPC name record storing at least one LPC name, at least one LPC name index pointing to a LPC name in said LPC name record, each LPC name identifying an LPC;

assigning a resource to a group in response to the LPC name index record and the LPC name record;

configuring a resource to an offline state if a respective LPC name index points to a LPC name in said LPC name record; and, for an LPC identified by a current LPC name, configuring a resource to an online state if said LPC name index points to a LPC name which matches the current LPC name.

13. The storage medium of claim 12 wherein:

said resource is a channel path and said resource identifier is a CHPID.

14. The storage medium of claim 12 wherein:

said LPC name index has a first value if said LPC name index does not point to a LPC name in said LPC name record.

15. The storage medium of claim 14 wherein said first value is zero.

16. The storage medium of claim 12 wherein:

said assigning includes responding to an identify LPC name command and returning a list of resource identifiers having a LPC name index pointing to a desired LPC name.

17. The storage medium of claim 16 wherein:

said assigning further comprises receiving said desired LPC name;

comparing said desired LPC name to LPC names in said LPC name record;

determining a desired LPC name index in response to said comparing; and, identifying a resource having said desired LPC name index.

18. The storage medium of claim 12 further comprising instructions for causing the machine to implement:

storing said LPC name index record and said LPC name record in a current configuration data set;

changing from said current configuration data set to a target configuration data set by comparing a current LPC name index to a corresponding target LPC name index; and allowing said changing from said current configuration data set to said target configuration data set in response to said comparing.

* * * * *